May 25, 1926.
E. C. NORTON
VEHICLE BRAKE
Filed Sept. 12, 1925
1,586,214
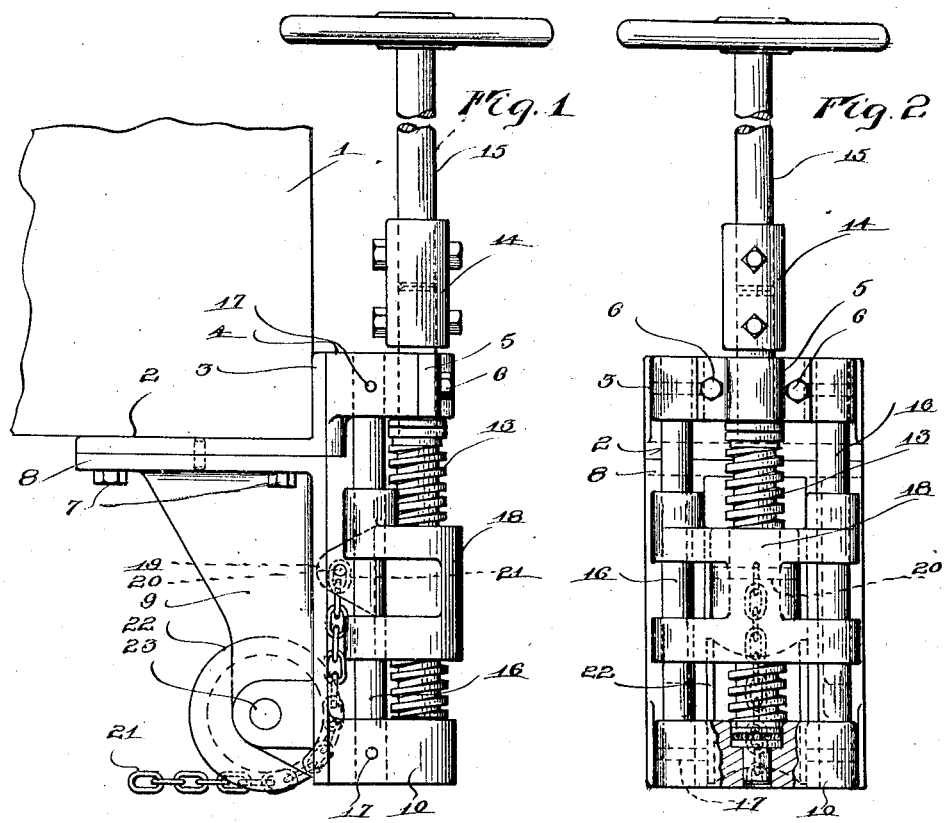
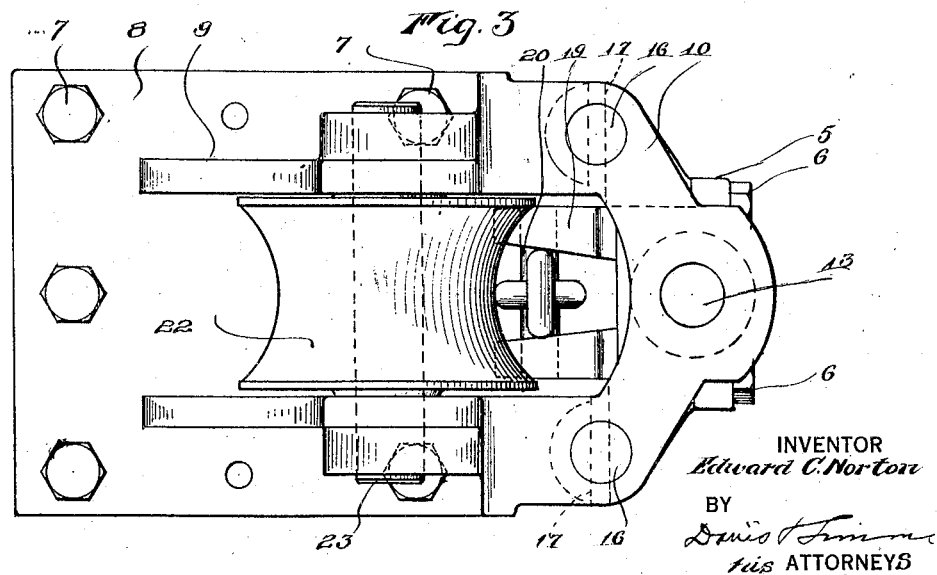
INVENTOR
Edward C. Norton
BY
his ATTORNEYS Patented May 25, 1926.

1,586,214

UNITED STATES PATENT OFFICE.

EDWARD C. NORTON, OF ROCHESTER, NEW YORK.

VEHICLE BRAKE.

Application filed September 12, 1925. Serial No. 55,925.

The present invention relates to vehicle brakes and an object thereof is to provide a brake which is simple to operate, transmits constant power to the brakes from the hand wheel, and dispenses with locking devices.

To this and other ends, the invention consists of certain parts and combinations of parts, all of which will be hereinafter described: the novel features being pointed out in the appended claims.

In the drawings:

Fig. 1 is a side view of the mechanism;

Fig. 2 is a front view; and

Fig. 3 is a bottom view.

Referring more particularly to the drawing, 1 indicates the vehicle and 2 a bracket secured to the underside of the vehicle and having an upward extension 3 abutting the front face of the vehicle. This upward extension carries a bearing piece 4 which has a bearing cap plate 5 secured thereto by bolts 6. Secured to the underside of the plate 2 by bolts 7 is a bracket 8, this bracket having two spaced arms 9 depending therefrom and connected at their outer ends by a bearing piece 10. Mounted to turn in the bearing pieces 4 and 10 is a worm shaft 13 projecting above the bearing 4 and carrying a coupling 14 to which the hand wheel shaft 15 is secured.

Arranged in rear of and on opposite sides of the worm shaft 13 are two guides 16 in the form of rods fitted in openings in the two bearing members 4 and 10 and held therein by pins 17. These rods act as guides for a nut 18 which operates upon the worm shaft 13. This nut 18 has at its rear, two lugs 19 projecting between the guide rods 16 and having the space between them bridged by a pin 20. This pin is removable and passes through a link of a flexible connection 21 which extends downwardly from the nut substantially parallel with the guide rods 16 and passes tangentially to a pulley 22, and about the same, said pulley turning on a shaft 23 connecting the bracket arms 9 and bridging the space between the bracket arms. The flexible connection 21 leads to the brakes.

When it is desired to apply the brakes the worm 13 is turned in a direction to elevate the nut 18. The periphery of the pulley or wheel 22 is substantially at a vertical line with the pin 19 so that a direct pull on the flexible connection is secured. Owing to the fact that the flexible connection passes about the pulley, a constant power is maintained as the force on the pulley is always in one direction. Owing to the fact that the flexible connection is operated through a nut and worm, no locking device is required as these two parts act together to prevent any relative shifting except by the turning of the worm shaft through the hand wheel shaft 15. This mechanism unfailingly delivers the braking power when and as required. It may be operated by one man with less effort than has been heretofore required. The brake cannot get out of control of the brakeman and the amount of time required to apply the brake is materially reduced.

What I claim as my invention and desire to secure by Letters Patent is:

1. A vehicle brake comprising supporting means having two projecting bearings, a worm shaft turning in said bearings, a nut operating on the worm shaft between the bearings, guides for the nut connecting the bearings on opposite sides of the worm shaft, a flexible connection secured to the rear of the nut centrally between the two guides and directly in rear of the worm shaft, and a pulley mounted to turn about a horizontal axis in rear of the worm and having the flexible connection passing downwardly in front of it and thence thereunder.

2. A vehicle brake comprising a worm shaft, a nut operating on the shaft, two guides on which the nut travels, a pulley mounted in rear of the nut to turn about a horizontal axis above the lower end of the worm, and a flexible connection secured to the nut directly in rear of the worm passing downwardly therefrom in front of and under the pulley.

3. A vehicle brake comprising two members, each provided with a bearing, a worm journalled in the bearings of the two members, guides connecting the two members, a nut movable on the guides and on the worm, a pulley mounted to turn on one of the members, and a flexible brake-operating connection secured at one end to the nut and passing around the pulley.

4. A vehicle brake comprising two members, one of which is provided with a bearing, and the other of which has two arms depending therefrom and a bearing connecting the lower end of the arms, a worm journalled in the bearings of the two members, a pulley arranged to turn between the arms, a nut operable on the worm between the two bearings, guiding means connecting the two bearing members and having the nut slidable thereon, and a flexible connection for operating the brake passing about the pulley and having one end secured to the nut.

5. A vehicle brake comprising two members, one of which is provided with a bearing and the other of which has two depending arms and a bearing connecting said arms, a worm mounted to turn on the bearings of the two members, a pair of rods connecting the two bearings in rear of and on opposite sides of the worm, a nut movable on the worm and the two guide rods and having two projections extending between the guide rods, a pulley journalled on the two arms of the bracket, and a flexible brake-operating connection passing about the pulley and secured to the two projections of the nut, said flexible connection extending between the nut and the pulley substantially parallel with the guides and tangential of the pulley.

EDWARD C. NORTON.